Jan. 29, 1924.

G. W. CONNER 1,482,347

FIXTURE CANOPY

Filed March 21, 1922

Inventor
George W. Conner,
by Emery Booth Janney & Varney,
Attys.

Patented Jan. 29, 1924.

1,482,347

UNITED STATES PATENT OFFICE.

GEORGE W. CONNER, OF ROSLINDALE, MASSACHUSETTS.

FIXTURE CANOPY.

Application filed March 21, 1922. Serial No. 545,534.

*To all whom it may concern:*

Be it known that I, GEORGE W. CONNER, a citizen of the United States, and a resident of Roslindale, county of Suffolk, and Commonwealth of Massachusetts, have invented an Improvement in Fixture Canopies, of which the following description, in connection with the accompanying drawings, is a specification, like characters on the drawings representing like parts.

My invention relates to fixture canopies and is particularly concerned with the provision of simple, inexpensive and durable means for securing a fixture canopy to and centering it with the fixture pipe.

My invention will be best understood from the following description when read in connection with the accompanying drawings of one specific embodiment of my invention selected for illustration, while the scope of my invention will be more particularly pointed out in the appended claims.

In the drawings:—

Figure 1:
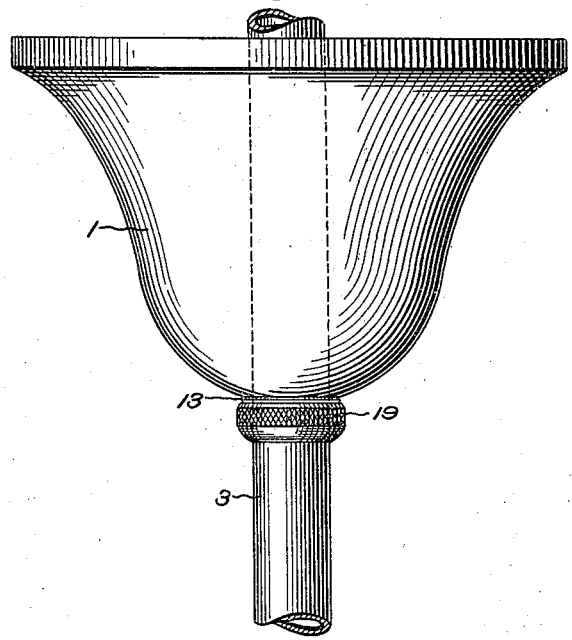
Fig. 1 shows in elevation a fixture canopy and fixture pipe in assembled relation.
Figure 2:
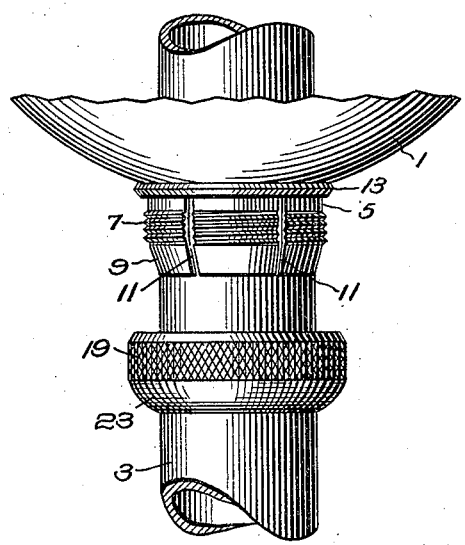
Fig. 2 shows the device according to Fig. 1 on an enlarged scale and with parts broken away and with the securing means in released position.
Figure 3:
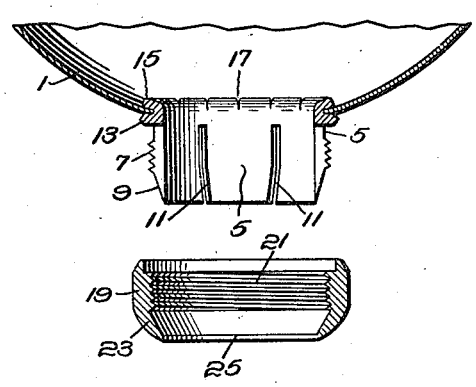
Fig. 3 is a longitudinal section according to Fig. 2 with the fixture pipe omitted.

Referring to the drawings, the canopy is indicated at 1 and the fixture pipe at 3. The fixture pipe in the submitted embodiment of my invention is of circular cross section but it will be understood that my invention is not limited to use with pipes of this shape.

The canopy, which preferably is made of sheet metal, is provided at its lower portion with an axial opening through which the fixture pipe 3 passes. This opening carries a sleeve 5, the exterior of which is of circular cross section and the interior is of cross section to correspond to that of the fixture pipe. At an intermediate portion the exterior of the sleeve is provided with screw threads 7 while at its forward portion the exterior is provided with a taper or bevel 9. For rendering the sleeve flexible, it is provided with a plurality of conveniently located saw cuts 11.

For securing the sleeve to the canopy I provide adjacent the rearward end of the sleeve a flange 13 which abuts the forward surface of the canopy about the edges of the opening provided for the fixture pipe, while the portion of the sleeve rearwardly of the flange 13 I cause to project into the interior of the canopy and to be bent over as is indicated at 15 to conform with the interior of the canopy about the edges of the opening. The portion of the sleeve indicated at 15 and the adjacent material of the canopy, in the submitted embodiment of my invention are crimped, as is indicated at 17, to cause the material of the sleeve to engage the material of the canopy and thereby prevent relative rotation between these two parts. This may be done by causing a crimping tool to operate on the portion 16 after this portion has been bent over or the entire operation of crimping and bending may be done by the same tool in a single operation.

For causing the flexible members provided by the portions of the sleeve intermediate the saw cuts to grip the fixture pipe I provide a nut 19, the intermediate interior portion of which is screw threaded as is indicated at 21, while the forward portion is provided with a flange 23 presenting the small interior diameter portion 25. When the nut is screwed on the sleeve, the small diameter portion 25 engages the tapered portion 9 of the sleeve and in an obvious manner forces the flexible members against the exterior wall of the fixture pipe and in consequence of this secures the canopy to the fixture pipe.

It will be noticed that I have provided two screw threaded members, one of which is secured to the canopy and the other of which is rotatable relative to said canopy, and further that I have provided flexible members which are forced by rotation of the rotatable member into engagement with the fixture pipe. These flexible members in the submitted embodiment of my invention, as will be obvious, are provided with concave surfaces which engage the surfaces of the pipe for a substantial distance longitudinally thereof and thereby center the canopy with relation to the pipe and prevent a relative rocking movement between said canopy and pipe.

Although I have described for purposes of illustration one specific embodiment of my invention it will be understood that I am not limited thereby to its specific mechanical details but that within the scope of my invention wide deviations may be made therefrom without departing from the spirit of my invention.

Claims:

1. The combination with a fixture canopy of sheet material and provided with an opening for receiving a fixture pipe, of a sleeve member having a flange abutting the exterior of said canopy about the edges of said opening and a portion entering said opening and engaging the interior of said canopy about the edges of said opening, said sleeve being of internal diameter to fit said fixture pipe and having an extended portion forwardly of said flange, said extended portion being provided with a screw thread intermediate its length and with an exterior taper at its end forwardly of said screw threads, said extended portion being further provided with longitudinal slots substantially throughout its length, and a nut having screw threads for engaging the screw threads of said sleeve and a portion for engaging the tapered portion of said sleeve, whereby when the canopy is placed on said fixture pipe and the nut is screwed on the sleeve said nut will bind said sleeve to said fixture pipe.

2. As an article of manufacture, a sleeve adapted to surround and be clamped to a fixture pipe, said sleeve having formed integrally therewith an outwardly projecting shoulder near one end adapted to abut the exterior wall of a fixture canopy and also having formed integrally therewith a portion adapted to enter the opening in the canopy and be expanded and crimped against the interior wall of the canopy adjacent said opening whereby the sleeve may be permanently and firmly secured to the canopy to reinforce the canopy, the sleeve having longitudinal slots and also screw threads on its exterior whereby a clamping nut engaged with said threads may cause the sleeve to bind to the fixture pipe and be held fast.

In testimony whereof, I have signed my name to this specification.

GEO. W. CONNER.